United States Patent
Wolf et al.

(10) Patent No.: US 8,723,386 B2
(45) Date of Patent: May 13, 2014

(54) ELECTRICAL MACHINE, IN PARTICULAR AN ALTERNATOR

(75) Inventors: Gerd Wolf, Affalterbach (DE); Norbert Pfitzke, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 12/158,786

(22) PCT Filed: Dec. 27, 2006

(86) PCT No.: PCT/EP2006/070225
§ 371 (c)(1),
(2), (4) Date: Sep. 3, 2008

(87) PCT Pub. No.: WO2007/074159
PCT Pub. Date: Jul. 5, 2007

(65) Prior Publication Data
US 2009/0001840 A1    Jan. 1, 2009

(30) Foreign Application Priority Data
Dec. 23, 2005   (DE) .......................... 10 2005 061 892

(51) Int. Cl.
*H02K 3/38* (2006.01)
(52) U.S. Cl.
USPC .......................................... 310/179; 310/183
(58) Field of Classification Search
USPC .......................................... 310/183, 203, 179
See application file for complete search history.

(56) References Cited

U.S. PATENT DOCUMENTS

| 1,974,344 | A | * | 9/1934 | Oswald | 310/172 |
| 4,751,448 | A | * | 6/1988 | Auinger | 318/773 |
| 6,492,757 | B2 | * | 12/2002 | Nakamura et al. | 310/180 |
| 6,975,080 | B2 | * | 12/2005 | Kitamura et al. | 318/109 |
| 2001/0011852 | A1 | * | 8/2001 | Nakamura et al. | 310/215 |
| 2002/0125784 | A1 | * | 9/2002 | Bramson et al. | 310/184 |
| 2003/0132680 | A1 | * | 7/2003 | Nakamura et al. | 310/180 |
| 2005/0093521 | A1 | * | 5/2005 | Nishimura et al. | 322/32 |
| 2005/0116570 | A1 | * | 6/2005 | Edelson | 310/179 |

FOREIGN PATENT DOCUMENTS

| DE | 33 45 272 | 7/1985 |
| DE | 102 09 054 | 9/2002 |
| EP | 0 454 039 | 10/1991 |
| JP | 60204240 | 10/1985 |

* cited by examiner

*Primary Examiner* — Quyen Leung
*Assistant Examiner* — Naishadh Desai
(74) *Attorney, Agent, or Firm* — Michael J. Striker

(57) ABSTRACT

The invention relates to an electrical machine, especially an alternator (10) comprising a stator winding (11) with a total of seven phase conductors (P1 to P7) which are interconnected in series at the same electrical angle (a). The aim of the invention is to dampen magnet noise and to increase machine performance. For this purpose, at least every other electrically subsequent phase conductor (P) is skipped when the phase conductors (P1 to P7) are connected in series.

26 Claims, 8 Drawing Sheets

ELECTRICAL MACHINE, IN PARTICULAR AN ALTERNATOR

CROSS-REFERENCE TO RELATED APPLICATION

The invention described and claimed hereinbelow is also described in German Patent Application DE 10 2005 061 892.8 filed on Dec. 23, 2006. This German Patent Application, whose subject matter is incorporated here by reference, provides the basis for a claim of priority of invention under 35 U.S.C. 119(a)-(d).

BACKGROUND OF THE INVENTION

The present invention relates to an electrical machine, in particular to an alternator with a multiple-phase stator winding.

With alternators for motor vehicles, electrical machines are primarily used that include a claw-pole rotor excited by direct current, in order to adequately supply the DC electrical system of the particular motor vehicle even while the engine is idling. In addition to numerous other requirements on the alternator, it is also necessary to dampen the magnetic noise of the alternator, which is noticeable—and disturbing—in the lower rotational speed range of the machine in particular. To suppress the magnetic noises, it is known to distribute the individual phase windings on the three-phase stator winding of the alternator in such a manner that they are placed partially in the slots of the adjacent phase winding. This measure results in reduced alternator output and increased losses, however. Due to the ripple of the direct current that is output, it is also possible for oscillatory noises to occur in the wiring harnesses of the motor vehicle at certain engine speeds.

It is also known to equip the alternator with a six-phase system, in order to double the frequency of the rectification and, therefore, to reduce the ripple of the direct current, which is supplied via a rectifier assembly to a storage battery of the motor vehicle electrical system. It is known from EP 0454 039 B1 (FIG. 6) to design the stator winding of an alternator using two winding systems, each of which includes three phase windings that are interconnected to form a star connection. The phase windings are offset electrically by 120° in the star connection. The two winding systems are electrically offset from each other by approximately 30°. The magnetic noises of the machine that are produced are not adequately damped, however, particularly in the lower rotational speed range. A further disadvantage is the fact that machines of this type still have a large voltage and torque ripple, which applies in particular for high-output machines when operated either in the alternator mode or the engine mode. Finally, it is known from DE 102 09 054 A1 to use a seven-phase stator winding in order to dampen the magnetic noises and to reduce the current ripple of a motor vehicle alternator, and to connect its seven phase conductors—which lie side-by-side in the slots of a stator core—in a star connection, or to connect them in series to form a heptagon. Even though these designs have a lower current ripple and less magnetic noise than do seven-phase systems, they are still inadequately damped in the lower rotational speed range. In addition, the upward slope of the performance characteristic of the machine is insufficient, since, in motor vehicles, the power requirement in the vehicle electrical system is often high in the idling range of the internal combustion engine.

SUMMARY OF THE INVENTION

The object of the present invention, therefore, is to increase the damping of the magnetic noise and improve the electrical output in the lower rotational speed range of the electrical machine.

The inventive electrical machine has the advantage that, with the new type of connection of a seven-phase stator winding compared with the known designs, improved electromagnetic utilization is attained, which results in reduced voltage and torque ripple, a higher performance characteristic, and a further suppression of magnetic noises, particularly in the lower rotational speed range of the machine. A further advantage is that, with high-output alternators in particular, the reduced voltage and torque ripple also results in lower mechanical loads on the machine.

To simplify manufacture to the greatest extent possible, and to equalize the load on the machine, it is advantageous that all seven phase conductors are of equal size, they are composed of at least one coil, and they are interconnected at an electrical angle $\alpha$ that is between $180°/7 \approx 25.7°$ and $180°*4/7 \approx 102.9°$. With four-pole or multiple-pole machines, it is also advantageous for the manufacture of the stator winding when the individual phase conductors are composed of several coils, which are preferably connected in series. With a stator core with an equidistant distribution of teeth around the circumference of the working air gap of the machine, optimal damping of the magnetic noises and the voltage and torque ripple is attained when the phase conductors are interconnected at an electrical angle $\alpha$ of $180°/7*3° \approx 77.3°$. With an uneven distribution of teeth, the optimum of the electrical angle $\alpha$—which must be determined on an individual basis— is between 60° and 100°. Particularly good damping is attained when, if the seven phase conductors are connected in series, one electrically subsequent phase conductor is jumped over in every case, with the phase conductors preferably being connected in series in the phase sequence P1-P3-P5-P7-P2-P4-P6. It is also possible to jump over two electrically subsequent phase conductors in each case.

When the present invention is used in alternators for motor vehicles, a particularly advantageous design of the stator winding results when the connections between the phase conductors are guided outwardly to a converter, in particular to a rectifier assembly with seven rectifier bridges. The phase conductors are advantageously interconnected at one of the two winding overhangs of the machine such that, of the connections between the phase conductors, only one connection in each case is guided to one of the seven rectifier bridges.

With electrical machines, the stator windings of which may be manufactured using a winding wire, it is advantageous when the coils of each phase winding are wound with the winding wire. It may also be advantageous when the phase windings are also wound with a winding wire, in order to create the series connection in a cost-favorable manner.

With regard for the use of the electrical machine as an alternator in a 14V vehicle electrical system in motor vehicles, particularly good noise damping is attained when the number of phase conductors or coils in the stator slots is greater than five and smaller than 10, and is preferably eight.

With regard for noise damping, it has also proven advantageous when the phase conductors are placed in the slots of the stator core with a slot fill factor that is greater than 50%.

BRIEF DESCRIPTION OF THE DRAWINGS

Further details of the present invention are explained in greater detail below, as an example, with reference to the attached drawing.

DESCRIPTION OF THE PREFERRED EMBODIMENTS

Figure 1:
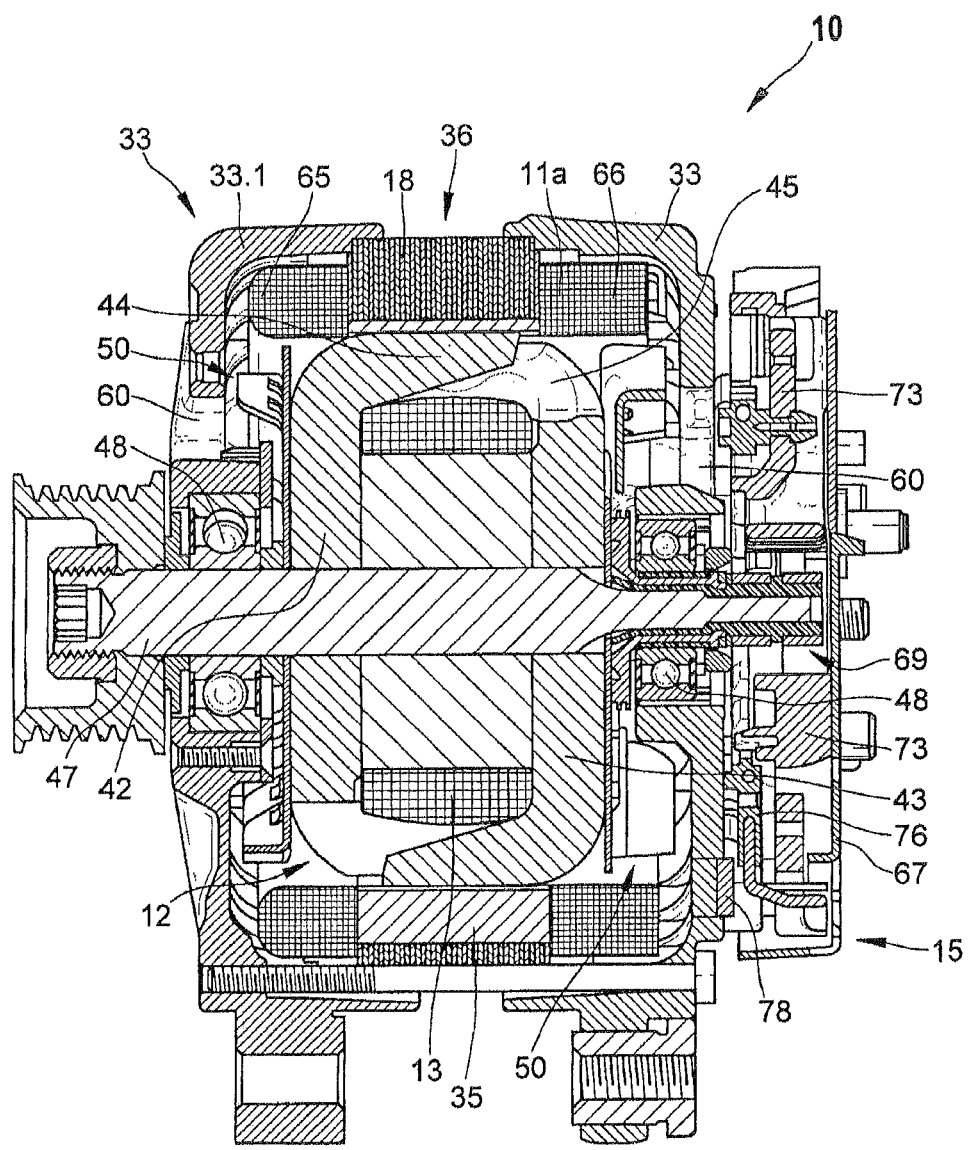
FIG. 1 shows a longitudinal sectional view through an alternator for motor vehicles with a claw-pole rotor.

FIG. 1 is a sectional view through an electrical machine, which is designed as an alternator 10 for motor vehicles. It includes, e.g., a two-piece housing 33, which is composed of a first end shield 33.1 and a second end shield 33.2. End shield 33.1 and end shield 33.2 enclose a stator 36 that includes an annular stator core 18, in whose inwardly open and axially extending slots 35 a stator winding 11a is placed. Annular stator 36 surrounds—via its radially inwardly oriented surface—a rotor 12, which is excited electromagnetically and is designed as a claw-pole rotor. Rotor 12 is also composed of two claw-pole plates 42 and 43, on the outer circumference of which axially extending claw-pole fingers 44 and 45 are located. Claw-pole plates 42 and 43 are located in rotor 12 such that their axially extending claw-pole fingers 44, 45 alternate with each other as north and south poles around the circumference of rotor 12. This results in magnetically required claw-pole intermediate spaces between oppositely-magnetized claw-pole fingers 44 and 45, which extend at a slight diagonal relative to the machine axis, given that claw-pole fingers 44 and 46 taper toward their free ends. For simplicity, their extension is referred to as axial in the description of the present invention, below. Rotor 12 is rotatably supported in particular end shields 33.1 and 33.2 via n shaft 47 and a roller bearing 48 located on each side of the rotor. Rotor 12 has two axial end faces, on each of which a fan 50 is mounted. Fan 50 is composed essentially of a plate-shaped or disk-shaped section, out of which fan blades extend in a known manner. Fans 50 serve to make air exchange possible—via openings 60 in end shields 33.1 and 33.2—between the outside and the interior of electrical machine 10. To this end, openings 60 are provided on the axial ends of end shields 33.1 and 33.2, via which cooling air is drawn into the interior of electrical machine 10 by fan 50. This cooling air is accelerated radially outwardly via the rotation of fans 50, so that it may pass through winding overhangs 65—which are permeable to cooling air—on the drive side, and through winding overhangs 66 on the electronics side (the side with the slip ring, brushes, or rectifier). The winding overhangs are cooled via this effect. After the cooling air passes through the winding overhangs, or after it has flowed around these winding overhangs, it follows a path radially outwardly through not-shown openings between segments, which are indicated. A protection cap 67, which protects various components from environmental influences, is shown at the right in FIG. 1.

Protective cap 67 covers, e.g., a slip-ring assembly 69, which supplies an excitation winding 13 with excitation current. A heat sink 73, which acts as a positive heat sink in this case, is located around slip-ring assembly 69. End shield 33.2 serves as the negative heat sink. A connecting plate 76 is located between end shield 33.2 and heat sink 73, which connects negative diodes 78 installed in end shield 33.2 and positive diodes—which are not shown in this illustration—of a rectifier 15 in heat sink 73 with each other, in the form of a bridge circuit.

Figure 2:
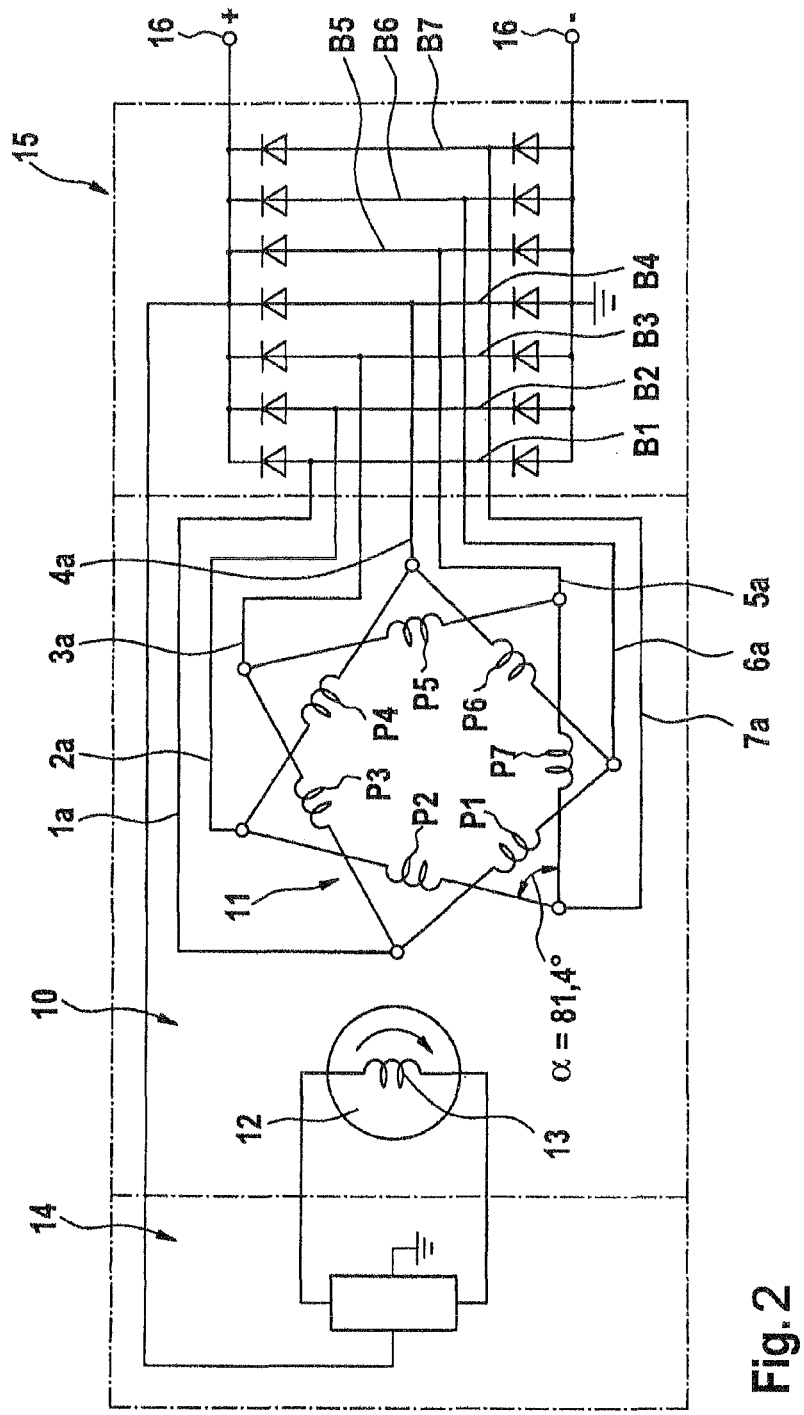
FIG. 2 shows the wiring diagram of an alternator with an inventive stator winding and rectifier assembly.

FIG. 2 shows a schematic depiction of an inventive electrical machine in the form of an alternator 10 for supplying power to the electrical system of motor vehicles. Alternators of this type, which include a multi-phase stator winding 11, are typically equipped with an electrically excited claw-pole rotor 12, the excitation winding 13 of which is supplied with power via a controller 14 from the direct-current output of a rectifier unit 15, and which is installed along with controller 14 on the not-shown rear end shield of the alternator, and is fixedly connected therewith. Depending on the number and connection of phase conductors of stator winding 11, when the alternator is operated, a direct current that is pulsating to a greater or lesser extent is provided at the output of rectifier assembly 15 to the not-shown vehicle electrical system, in which positive and negative terminals 16 of rectifier assembly 16 are connected directly with a storage battery in the vehicle.

Fan noises are induced—as the rotational speed increases—by the fans that are typically used with machines of this type. Depending on the type and connection of stator winding 11, and in interaction with claw-pole rotor 12, these fan noises are superposed with magnetic noises created by the stator winding. These magnetic noises occur in the lower speed range in particular, so they are perceived as particularly disturbing.

To dampen the magnetic noises of the electrical machine to the greatest extent possible, and to reduce their voltage and torque ripple, stator winding 11 of alternator 10 is provided with a total of seven phase conductors P1 through P7. All seven phase conductors are identical in terms of their number of coils and windings, and they are connected with each other at the same electrical angle α. In the exemplary embodiment shown in FIG. 2, phase conductors P1 through P7 are connected in series such that, in the series connection, one electrically subsequent phase conductor is jumped over in each case. As shown in FIG. 2, the result is that phase conductors P1 through P7 are connected in series in phase sequence P1-P3-P5-P7-P2-P4-P6. In this manner, all phase conductors P1 through P7 are interconnected at an electrical angle α of 180/7*3°≈77.1°. With alternators that have different tooth distributions on their stator cores, it is therefore not possible to interconnect the seven phase conductors with the same electrical angle α. To attain good damping of magnetic noises and ripples in this case as well, it is necessary to interconnect phase conductors P1 through P7 in the aforementioned phase sequence at an electrical angle α, which is in the range between 60° and 100°.

An electrical machine, in particular an alternator for a motor vehicle, is therefore provided that includes a rotor 12 and claw-pole fingers 44, 45 that extend in the axial direction and alternate between the north and south pole around the circumference of rotor 12, a stator 36, which includes a stator core 18 with a stator winding 11 located in slots 35 of stator core 18, stator 36 being located opposite to rotor 12. Stator 36 and rotor 12 are supported by two end shields 33, with an annular coil-shaped excitation winding 13 attached to rotor 12. Stator winding 11 includes seven phase windings P1, P2, P3, P4, P5, P6, P7, which are connected in series at an electrical angle α that is at least nearly uniform. With the series connection of phase conductors P1, P2, P3, P4, P5, P6, P7, at least one adjacent phase conductor P1, P2, P3, P4, P5, P6, P7 is jumped over in each case. The connection or series connection of phase conductors P1, P2, P3, P4, P5, P6, P7 is designed such that the electrically active winding path of stator winding 11 and, therefore, the seven phase conductors P1, P2, P3, P4, P5, P6, P7, is closed after two revolutions.

Figure 2A:
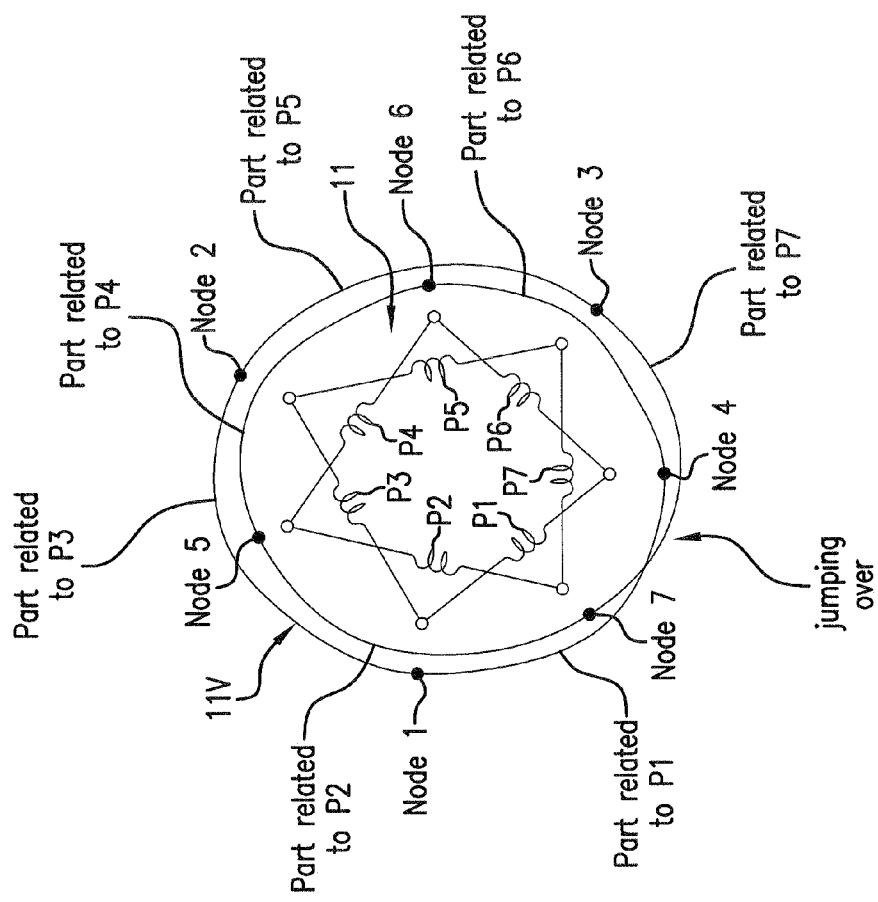
FIG. 2A illustrates the series conductive nature of the path of the seven phase conductors of the multi-phase stator winding.

FIG. 2A depicts multi-phase stator winding 11 separately, surrounded by a virtual conductor 11V (virtual conductor 11V is for exemplary purposes and is not actually found in the electrical machine) formed as two interconnected loops in a seris interconnection. The two loops of virtual conductor 11V include nodes (Node1, Node2, Node3, Node4, Node5, Node6, and Node7), between which are representative parts of the conductor loop formed out of phase conductors(P1 through P7), which is closed after two revolutions. That is, the part related to phase conductor P1 is between Node4, and Node1, the part related to phase conductor P3 is between Node1 and Node2, the part related to phase conductor P5 is between Node2 and Node3, the part related to phase conductor P7 is between Node3 and Node7, the part related to phase conductor P2 is between Node7 and Node5, the part related to phase conductor P4 is between Node5 and Node6, and the part related to phase conductor P6 is between Node6 and Node4, as shown.

In addition, an alternator 10 is provided, with which stator winding 11 includes winding overhangs 65, 66, which may be cooled by an approximately radial flow of cool air created by fans 50 installed on at least one axial end of a claw-pole plate 42, 43.

As shown in FIG. 2, the connections between phase conductors P1 through P7 are each guided to one of seven rectifier bridges B1 through B7 of rectifier assembly 15. Rectifier bridges B1 through B7 are connected to a two-path rectifier assembly 15 in a known manner using two diodes in each case. The connection of phase conductors P1 through P7 is advantageously located on the rear winding overhang of the machine, in whose region rectifier assembly 15 is also located, in a known manner. It is provided that, of the connections between phase conductors P1 through P7, only one connection 1a through 7a is guided to one of the seven rectifier bridges B1 through B7 in each case.

Figure 3:
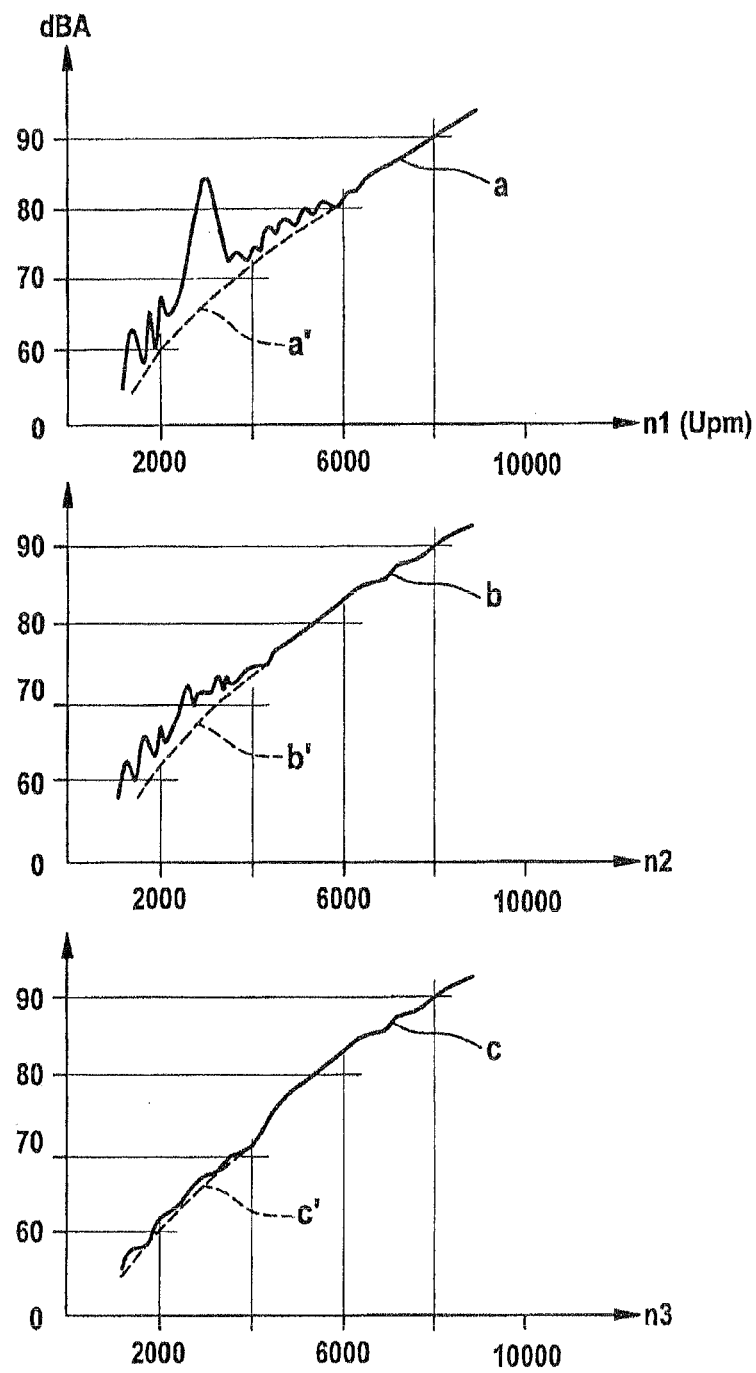
FIG. 3 shows the rotational speed vs. noise characteristics of various alternators.

FIG. 3 shows a comparison of the noise characteristic—which is a function of rotational speed and is produced by the alternator shown in FIG. 2—with the noise characteristics of known alternators of the same size. Noise characteristic a of an alternator with a known three-phase stator winding is shown in upper graph n1. It shows a significant increase in noise in the lower rotational speed range between 1500 and 4000 rpms, which is due to the magnetic noises of the alternator and which are superposed on the fan noise. When the rotor excitation of the alternator is switched off, what is left are the noises that are generated solely by the fan of the machine, as indicated as dashed characteristic a'. The noise level—which is a function of rotational speed—of an alternator with a known, seven-phase stator winding connected in a heptagon shape is plotted as characteristic b in middle graph n2. In this case as well, a noise level that is less than characteristic a but that is still elevated is also noticeable in the lower rotational speed range between 1500 and 4000 rpms compared with the pure fan noise plotted as characteristic b'. This noise level is still perceived to be disturbing. Finally, with an alternator with a seven-phase stator winding that is connected as shown in FIG. 2, the magnetically-induced noise level is now also damped in the lower rotational speed range—as indicated by characteristic c in graph n3—to the extent that it is acoustically practically imperceptible compared with the fan noise indicated by characteristic c'.

Figure 4:
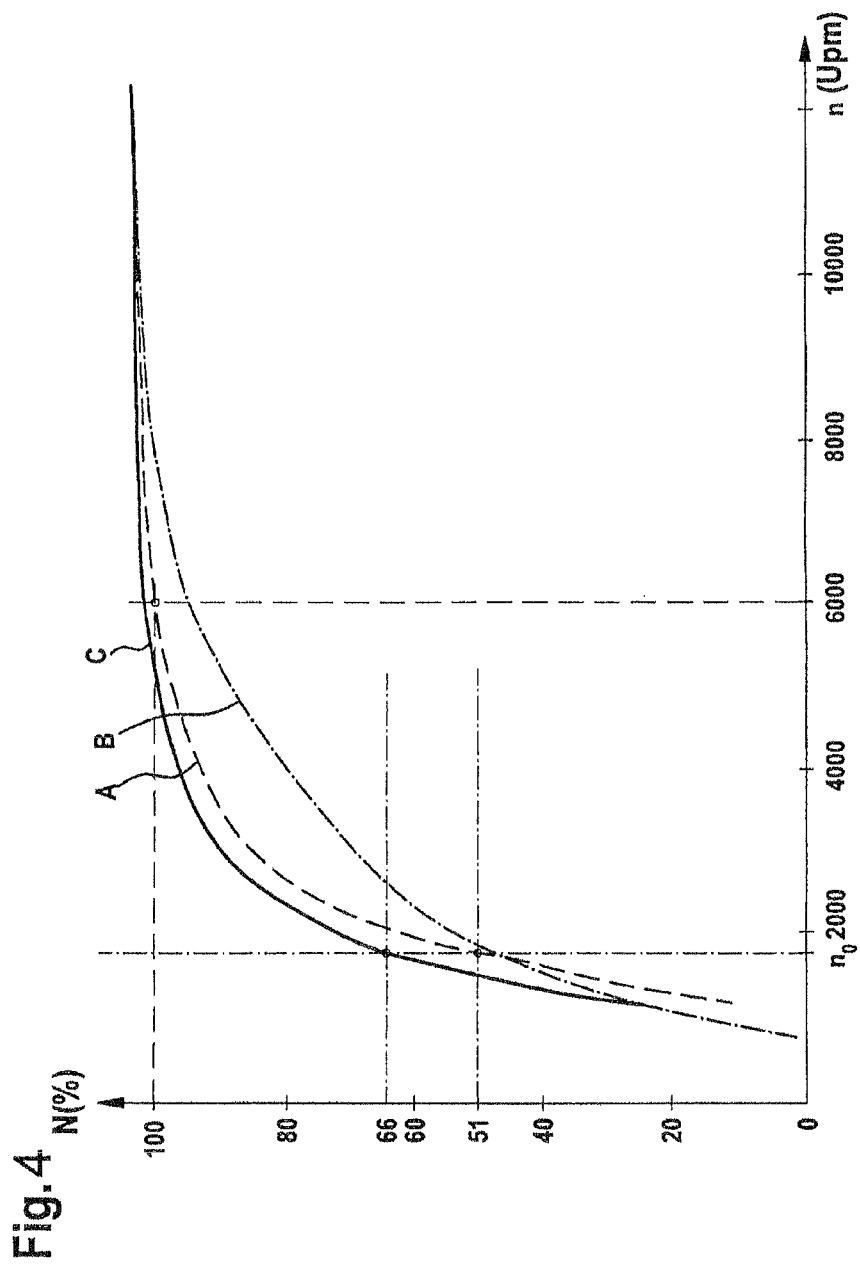
FIG. 4 shows the rotational speed vs. output characteristics of generators, by comparison.

The performance characteristics of the alternators are plotted against rotational speed in a diagram in FIG. 4. Dashed characteristic A shows the course of power output by an alternator with a known three-phase stator winding, the nominal output of which is 100%, and which is attained at a rotational speed n of 6000 rpms. Characteristic B, which is plotted as a dashed-dotted line, shows the power output of an alternator whose stator winding is composed in a known manner of seven phases connected in a heptagon shape. Solid-line characteristic C shows the rotational speed-dependent output of an inventive alternator with a seven-phase stator winding that is connected as shown in FIG. 2.

The comparison of these characteristics reveals that the alternator designed according to the present invention—per its characteristic C—attains its nominal output at approximately 5000 rpms and, in the lower rotational speed range in particular, may output much more power than the known designs represented by characteristics A and B. At a no-load speed $n_0$ of 1800 rpms, the output could therefore be raised from approximately 51% per characteristic A and B to 66% per characteristic C.

Figure 5:
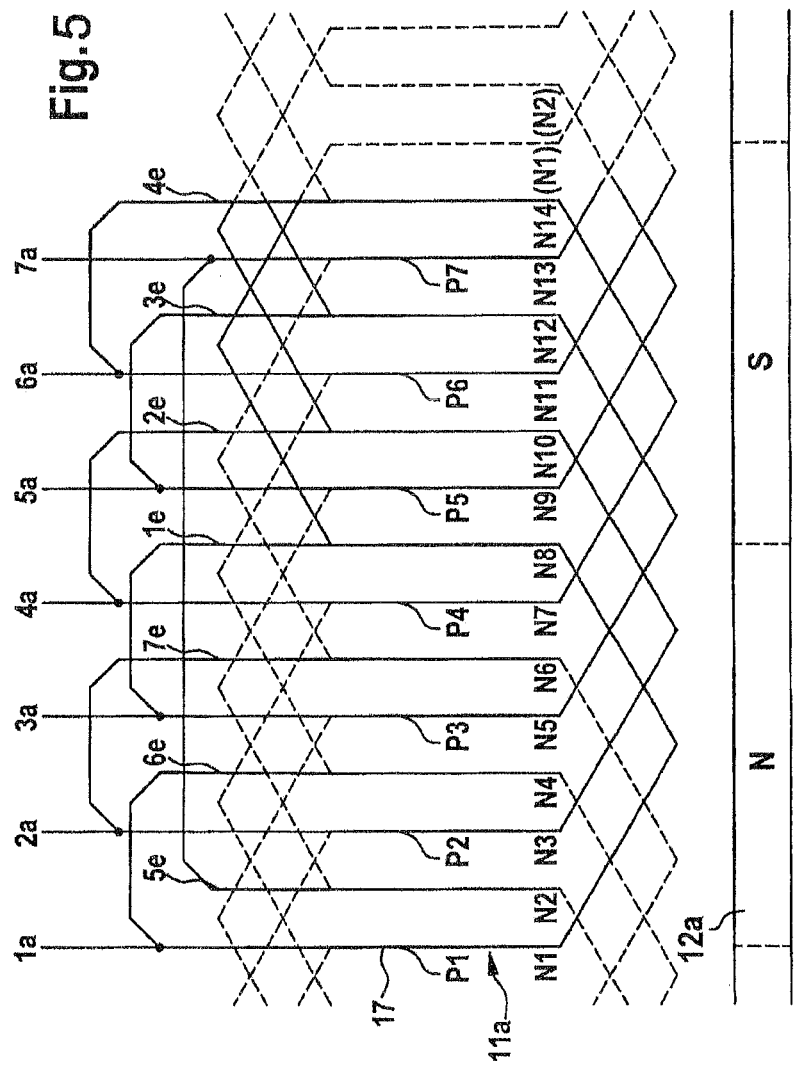
FIG. 5 shows a winding scheme of an inventive stator wave winding.

FIG. 5 shows a schematic depiction of a winding scheme of a seven-phase stator winding 11a, in which the seven phase conductors P1 through P7 are placed—in the form of a wave winding—in the slots of a not-shown stator core. In the present example, the machine has a two-poled rotor 12a. As indicated with a dashed line on the right-hand side in FIG. 4, each phase conductor P1 through P7 is inserted in several waves into slots N1 through N14, thereby resulting in a coil composed of one or more windings for each phase conductor P1 through P7. The starts of phase conductors P1 through P7 are labeled as 1a through 7a, and the ends are labeled as 1e through 7e. The winding step of wave winding 11a involves seven slots. Ends 1e through 7e of winding conductors P1 through P7 form the connections with the coil start of the subsequent phase conductor in the series. Since, with the series connection of phase conductors P1 through P7, the electrically subsequent coil phase is jumped over in this case as well in order to dampen the magnetic noise and ripple in an optimal manner, the coil phases are connected in series in this case just as they are in the exemplary embodiment shown in FIG. 2. End 1e of first phase winding P1 is connected with winding start 3a of phase conductor P3, whose end 3e is connected with start 5a of phase conductor P5, whose end 5e is connected with start 7a of phase conductor P7, whose end 7e is connected with start 2a of phase conductor P2, whose end 2e is connected with start 4a of phase conductor P4, whose end 4e is connected with start 6a of phase conductor P6, whose end if connected with start 1a of first phase conductor P1. All seven connections are located on the same side, at rear winding overhang of stator winding 11a, with starts 1a through 7a of phase conductors P1 through P7 being guided outwardly for connection with a rectifier assembly 15 with seven rectifier bridges—as shown in FIG. 2—of the machine.

Figure 6:
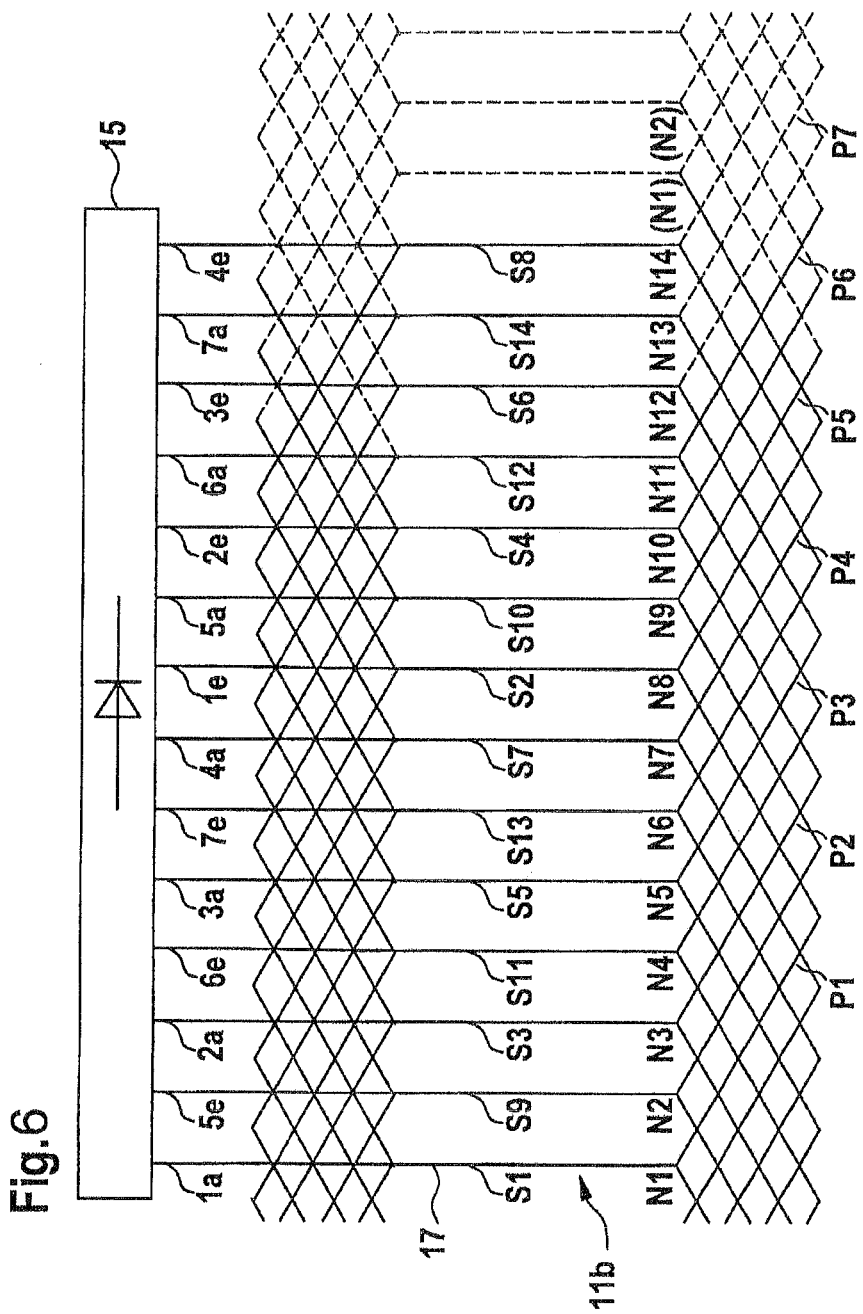
FIG. 6 shows a further winding scheme with a stator loop winding.

FIG. 6 shows, as a further exemplary embodiment, the winding scheme of a seven-phase stator winding in the form of a loop winding, which is also inserted in 14 slots, N1 through N14, of a stator core, for a two-poled rotor as shown in FIG. 5. In this case, phase conductors P1 through P7 are formed of two series-connected coils S1 through S14 with a winding step that includes seven slots. For coil phase P1, for example, first coil S1 is placed with, e.g., four windings, in slots N1 and N8. Coil start 1a is guided out for connection with a rectifier assembly 15 at the rear winding overhang. Subsequently and without interruption, second coil S2 is placed with four windings in slots N8 and N1, and its end 1e is also guided out to rectifier assembly 15. In the same manner, coils S3 and S4 of second phase conductor P2 are inserted, with four windings each, in the stator slots, with coil S3 located in slots N3 and N10, and coil S4 located in slots N10 and N3. In this case as well, start 2a of coil phase P2 and its end 2e are guided out at rear winding overhang to rectifier assembly 15. This scheme repeats in the same manner for subsequent phase conductors P3 through P7. The seven phase conductors are connected in the phase sequence illustrated in FIG. 2 using appropriate, not-shown connecting posts inside rectifier assembly 15. Advantageously, the two series-connected coils S of each phase winding P are wound with a winding wire 17. Likewise, all seven phase conductors P may be wound with a winding wire 17 in order to attain the desired series connection, in which case—as shown in FIG. 4—ends 1e through 7e of phase windings P1 through P7 are placed— as connections with particular start 3a through 2a of the second phase winding P ahead—on the winding overhang of the machine located on the rectifier side.

Figure 7:
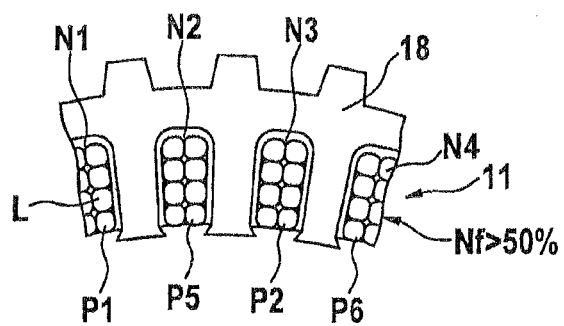
FIG. 7 shows a section of a stator core of the electrical machine shown in FIG. 2, with an inventive stator winding.

FIG. 7 shows a section of a stator core 18 of alternator 10 in FIG. 1 with seven-phase stator winding 11. Phase conductors P1, P5, P2, P6 are accommodated in adjacent slots N1, N2, N3, N4 with eight conductors L in each case. As shown in FIG. 6, phase conductors P may be made of two series-connected coils, each with four conductors L, or they may be made of a wave winding with eight waves, as shown in FIG. 5. With regard for damping the magnetic noise, it has also proven advantageous when phase conductors P are placed in slots N of stator core 18 with a slot fill factor Nf that is greater than 50%, as shown in the embodiment depicted in FIG. 7.

Figure 8:
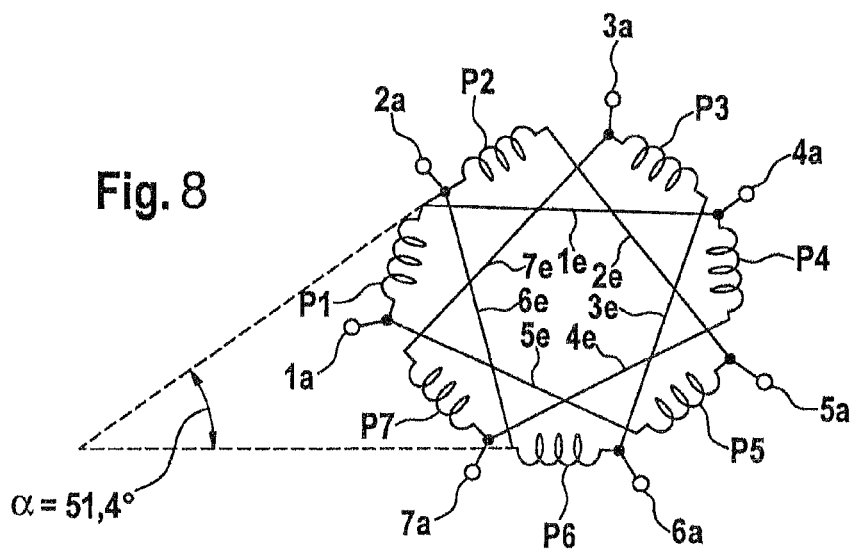
FIG. 8 shows a further variant of the connection of the seven-phase stator winding.

FIG. 8 shows a further possible connection configuration of seven-phase stator winding 11 in which, with individual phase conductors P1 through P7 connected in series, two subsequent phase conductors P are jumped over in each case. In this manner, phase conductors P are connected in series in phase sequence P1-P4-P7-P3-P6-P2-P5 via connections 1e through 7e. In this case as well, starts 1a through 7a of coil phases P1 through P7 are guided out on the end face for connection with a rectifier assembly 15 as shown in FIG. 2. With the connection configuration, phase conductors P1 through P7 are connected in series at an electrical angle α of 180/7°≈25.7°. This variant may be less optimal than the embodiment depicted in FIG. 2 in terms of noise and performance.

Due to the various possibilities for connecting seven-phase stator winding 11 in series, and due to different tooth distributions, an electrical angle α in the range between 50° and 90° results for series-connected phase conductors P.

The present invention is not limited to the exemplary embodiments shown and described in FIGS. 1 through 8. It is entirely possible, for example, when the present invention is used in alternators for motor vehicles with a vehicle electrical supply voltage of 14 V, to select the number of conductors Z in slots N of stator core 18 to be greater than 5 and less than 10, provided this is advantageous in terms of optimizing the machine output. A preferred application of the present invention results with alternators for motor vehicles with 4-pole to 18-pole claw-pole rotors and a controlled excitation current. Instead of a phase conductor of the stator winding that has been wound with a winding wire, it may be more advantageous for high-performance electrical machines to place pre-manufactured conductor rods in the slots of the stator core and to interconnect them at the winding overhang using a known technique. In addition, the individual coils of phase conductors P may be connected in series or in parallel. Instead of a thick winding wire, it is also possible to wind two or more parallel winding wires to form phase conductors.

What is claimed is:

1. An electrical machine, with a rotor (12) and claw-pole fingers (44, 45) that extend in an axial direction and alternate between the north and south pole around a circumference of the rotor (12), a stator (36), which includes a stator core (18) with a stator winding (11) located in slots of the stator core (18), the stator (36) being located opposite to the rotor (12); the stator (36) and the rotor (12) are supported by two end shields (33), with an annular coil-shaped excitation winding (13) attached to the rotor (12); wherein the stator winding (11) includes seven phase conductors (P1, P2, P3, P4, P5, P6, P7) that are placed in slots (N1 through N14) of the stator core (18) in a form of a wave winding, connected in series at an electrical angle α that is at least nearly uniform such that connections (1e through 7e) between the phase conductors (P1 through P7) are guided outwardly to a rectifier assembly (15) with seven rectifier bridges (B1 through B7), wherein the phase conductors (P1 through P7) are interconnected at one of the two winding overhangs of the machine (10) such that, of the connections (1e through 7e) between the phase conductors (P1 through P7), only one electrical connection of each connection (1e through 7e) is guided to one of the seven rectifier bridges (B1 through B7), and wherein at least one adjacent phase conductor (P1, P2, P3, P4, P5, P6, P7) is jumped over electrically in each case according to the following arrangement:

phase conductor P1 extends from connection 1a, through slot N1, into and through slot N8, ending at connection 1e, phase conductor P2 extends from connection 2a, through slot N3, into and through slot N10, ending at connection 2e, phase conductor P3 extends from connection 3a, through slot N5, into and through slot N12, ending at connection 3e, phase conductor P4 extends from connection 4a, through slot N7, into and through slot N14, ending at connection 4e, phase conductor P5 extends from connection 5a, through slot N9, into and through slot N2, beginning another phase, and ending at connection 5e, phase conductor P6 extends from connection 6a, through slot N11, into and through slot N4, beginning another phase, and ending at connection 6e, and phase conductor P7 extends from connection 7a, through slot N13, into and through slot N6, beginning another phase, and ending at connection 7e.

2. The electrical machine as recited in claim 1, wherein the stator winding (11) includes winding overhangs (65, 66), which are cooled by a substantially radial flow of cool air created by fans (50) installed on at least one axial end of a claw-pole plate (42, 43).

3. The electrical machine as recited in claim 1, wherein all seven phase conductors (P1, P2, P3, P4, P5, P6, P7) are of equal size, they are composed of at least one coil (S1 through S14), and they are interconnected at an electrical angle a that is between 60° and 100°.

4. The electrical machine as recited in claim 3, wherein the phase conductors (P1, P2, P3, P4, P5, P6, P7) are interconnected at an electrical angle α between 70° through 90°.

5. The electrical machine as recited in claim 1, wherein the phase conductors (P1, P2, P3, P4, P5, P6, P7) are connected in series in a phase sequence (P1-P3-P5-P7-P2-P4-P6), in which only one phase conductor (P) is jumped over.

6. The electrical machine as recited in claim 1, wherein a connection of the phase conductors (P1, P2, P3, P4, P5, P6, P7) is designed such that an electrically active winding path of the stator winding (11) and, therefore, of the seven phase conductors (P1, P2, P3, P4, P5, P6, P7), is closed after two revolutions.

7. The electrical machine as recited in claim 5, wherein coils (S1 through S14) of each phase conductor (P1 through P7) are wound with at least one winding wire (17).

8. The electrical machine as recited in claim 5, wherein a number of conductors (L) per phase conductors (P1 through P7) or coils (S1 through S14) in the stator slots (N1 through N14) is greater than 5 and less than 10.

9. The electrical machine as recited in claim 1, wherein the phase conductors (P1 through P7) are inserted in slots (N1 through N14) of a stator core (18) of the machine with a slot fill factor (Nf) that is greater than 50%.

10. The electrical machine as recited in claim 3, wherein all seven phase conductors (P1, P2, P3, P4, P5, P6, P7) are composed of several coils (S1 through S14).

11. The electrical machine as recited in claim 4, wherein all seven phase conductors (P1, P2, P3, P4, P5, P6, P7) are interconnected at the electrical angle 180°/7*3=77.1°.

12. The electrical machine as recited in claim 6, wherein the connection of the phase conductors (P1, P2, P3, P4, P5, P6, P7) is a series connection.

13. The electrical machine as recited in claim 7, wherein the coils (S1 through S14) of all phase conductors (P1 through P7) are wound with at least one winding wire (17).

14. The electrical machine as recited in claim 8, wherein the number of conductors (L) per element in the stator slots (N1 through N14) is 8.

15. An electrical machine, with a rotor (12) and claw-pole fingers (44, 45) that extend in an axial direction and alternate between a north pole and a south pole around a circumference of the rotor (12), a stator (36), which includes a stator core (18) with a stator winding (11) located in slots (N1 through N14) of the stator core (18), the stator (36) being located opposite to the rotor (12); wherein the stator (36) and the rotor (12) are supported by two end shields (33), with an annular coil-shaped excitation winding (13) attached to the rotor (12); wherein the stator winding (11) includes seven phase conductors (P1, P2, P3, P4, P5, P6, P7), which are placed separately in the slots (n1 through N14) of the stator core in a form of a loop winding and which are connected in series at an electrical angle α that is at least nearly uniform such that at least one adjacent phase conductor (P1, P2, P3, P4, P5, P6, P7) is jumped over in each case; wherein end connections (1e through 7e) between the phase conductors (P1 through P7) are guided outwardly to respective ones of seven rectifier bridges (B1 through B7) of a rectifier assembly (15), and start connections (1a through 7a) between the respective phase conductors (P1, P2, P3, P4, P5, P6, P7) guide away from the rectifier bridges (B1 through B7); wherein the phase conductors (P1 through P7) are interconnected at one of the two winding overhangs of the machine (10) such that, of the connections (1e through 7e) between the phase conductors (P1 through P7), only one electrical connection of each connection (1e through 7e) is guided to one of the seven rectifier bridges (B1 through B7); and wherein the start connections (1a through 7a) of respective phase conductors (P1 through P7) are guided to each of respective slots (N1, N3, N5, N7, N9, N11, N13), and the end connections (1e through 7e) of respective phase conductors (P1 through P7) are guided to each of respective slots (N2, N4, N6, N8, N10, N12 and N14) in such as way that the start connections (1a through 7a) and the end connections (1e through 7e) are arranged in an alternating manner.

16. The electrical machine as recited in claim 15, wherein the stator winding (11) includes winding overhangs (65, 66), which are cooled by a substantially radial flow of cool air created by fans (50) installed on at least one axial end of a claw-pole plate (42, 43).

17. The electrical machine as recited in claim 15, wherein all seven phase conductors (P1, P2, P3, P4, P5, P6, P7) are of equal size, they are composed of at least one coil (S1 through S14), and they are interconnected at an electrical angle α that is between 60° and 100°.

18. The electrical machine as recited in claim 17, wherein the phase conductors (P1, P2, P3, P4, P5, P6, P7) are interconnected at an electrical angle α between 70° through 90°.

19. The electrical machine as recited in claim 15, wherein the phase conductors (P1, P2, P3, P4, P5, P6, P7) are connected in series in a phase sequence (P1-P3-P5-P7-P2-P4-P6), in which only one phase conductor (P) is jumped over.

20. The electrical machine as recited in claim 15, wherein a connection of the phase conductors (P1, P2, P3, P4, P5, P6, P7) is designed such that an electrically active winding path of the stator winding (11) and, therefore, of the seven phase conductors (P1, P2, P3, P4, P5, P6, P7), is closed after two revolutions.

21. The electrical machine as recited in claim 19, wherein coils (S1 through S14) of each phase conductor (P1 through P7) are wound with at least one winding wire (17).

22. The electrical machine as recited in claim 19, wherein a number of conductors (L) per an element selected from the group consisting of phase conductors (P1 through P7), coils S1 through S14) and both in the stator slots (N1 through N14) is greater than 5 and less than 10.

23. The electrical machine as recited in claim 15, wherein the phase conductors (P1 through P7) are inserted in slots (N1 through N14) of a stator core (18) of the machine with a slot fill factor (Nf) that is greater than 50%.

24. The electrical machine as recited in claim 17, wherein all seven phase conductors (P1, P2, P3, P4, P5, P6, P7) are composed of several coils (S1 through S14).

25. The electrical machine as recited in claim 18, wherein all seven phase conductors (P1, P2, P3, P4, P5, P6, P7) are interconnected at the electrical angle 180°/7*3 =77.1°.

26. The electrical machine as recited in claim 20, wherein the connection of the phase conductors (P1, P2, P3, P4, P5, P6, P7) is a series connection.

* * * * *